G. ANDERSON.
CONNECTING BAR FOR HARROWS.
APPLICATION FILED JULY 31, 1909.
942,532.
Patented Dec. 7, 1909.
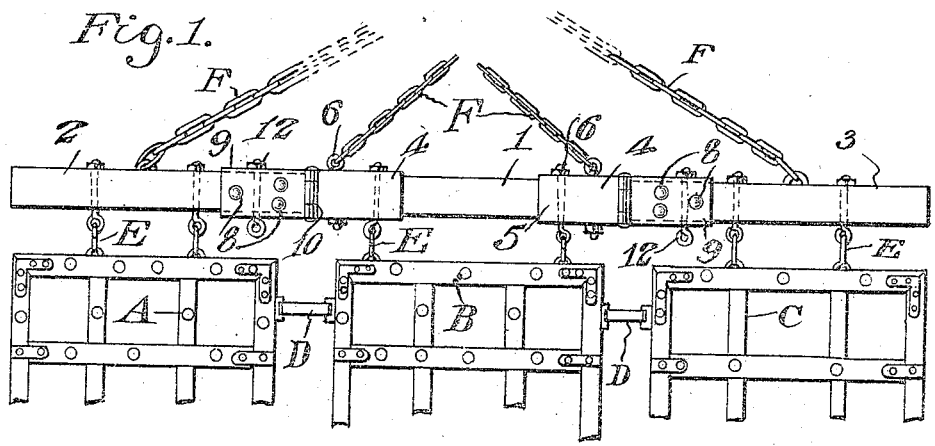
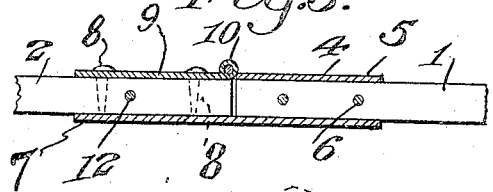
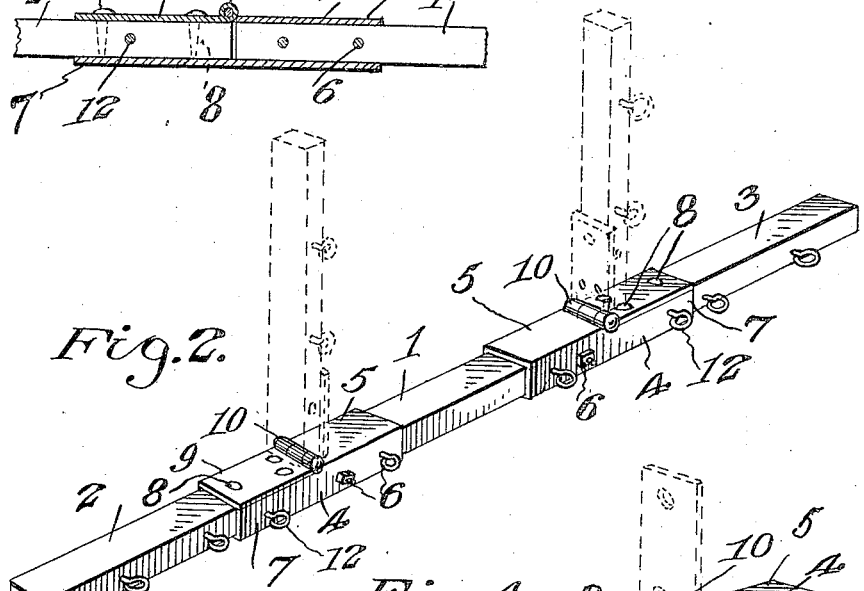
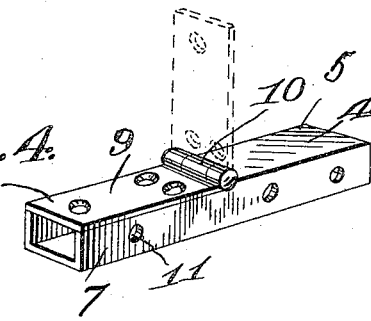
WITNESSES:
Joe. P. Wahler.
E. M. Ricketts.
INVENTOR
George Anderson
By Watson E. Coleman Attorney

UNITED STATES PATENT OFFICE.

GEORGE ANDERSON, OF BLADEN, NEBRASKA.

CONNECTING-BAR FOR HARROWS.

942,532.  Specification of Letters Patent.  Patented Dec. 7, 1909.

Application filed July 31, 1909. Serial No. 510,669.

*To all whom it may concern:*

Be it known that I, GEORGE ANDERSON, a citizen of the United States, residing at Bladen, in the county of Webster and State of Nebraska, have invented certain new and useful Improvements in Connecting - Bars for Harrows, of which the following is a specification, reference being had to the accompanying drawings.

This invention relates to improvements in draft bars and more particularly to one for connecting several harrow sections or similar implements or devices.

The object of the invention is to provide a simple and practical connecting or coupling bar of this character having a central member and two end members which are foldable upwardly over the central member so that when it is desired to fold the several sections of the harrow together to permit it to be moved over a road or through a gate the draft bar may be folded simultaneously with the harrow section.

With the above and other objects in view, the invention consists of the novel features of construction and the combination and arrangement of parts hereinafter fully described and claimed, and illustrated in the accompanying drawings, in which—

Figure 1 is a plan view of my improved connecting bar showing it applied to several harrow sections; Fig. 2 is a perspective view of the connecting or coupling bar; Fig. 3 is a detail longitudinal section through the same; and Fig. 4 is a perspective view of one of the coupling members.

My improved connecting draft bar consists of a central member 1 and two similar end members 2, 3, which latter are united to the ends of the central member by improved hinge or joint devices. Said members 1, 2, 3 are preferably in the form of rectangular bars and the joint devices or members 4 are in the form of rectangular sleeves which receive said members. Each of the joint sleeves 4 has a rectangular inner portion 5 which snugly receives one end of the central member 1 and which is rigidly secured thereto by transverse fastenings such as bolts 6. The outer or projecting end 7 of each of said joint members 4 has an open top so that it is channeled or of U-shape in cross section. Said open or channeled portion 7 is adapted to receive the inner end of one of the end members 3, which latter is secured by screws or similar fastenings 8 to a top plate 9 hingedly connected at 10 to the center of the top portion of the joint member 4. The side walls of the channeled or U-shaped end 7 of the member 4 are formed with transversely alined apertures 11, which latter are adapted to register with a transverse opening or aperture in one of the end members so that a bolt or other removable fastening 12 may be passed through said alining or registering apertures to lock the end member in the joint member 4.

While the invention may be used on various kinds of farm implements or machines, it is especially useful on harrows and, as illustrated in Fig. 1, it is attached to a harrow consisting of three sections A, B, C, hingedly connected by hinge links D or any other suitable means so that the side or end sections A, C may be folded up over the central section B. Loose links E or other means may be provided for connecting the three harrow sections to the three members of the improved draft bar.

F denotes draft chains extending from the three members of the connecting draft bar to a suitable draft tree or draft trees (not illustrated), but it will be understood that any other draft connections may be substituted for the chains F.

Having thus described the invention what is claimed is:

1. A coupling bar of the character described comprising a central and end members, sleeves upon the ends of the central member and having channeled outer ends, top plates for said channeled outer ends hinged to said sleeves and secured to the end members, whereby the latter may swing upwardly out of the channeled ends of said sleeves and means for retaining said end members in the channeled ends of said sleeves and in longitudinal alinement with the central member.

2. A coupling bar of the character described comprising a central and end members, sleeves upon the ends of the central member and having channeled outer ends, top plates for said channeled outer ends hinged to said sleeves and secured to the end members, whereby the latter may swing upwardly out of the channeled ends of said sleeves, the opposite side walls of the channeled ends of the sleeves and said end members being formed with transverse openings adapted to register when the end members are in the channeled portions of the sleeves and in longitudinal alinement with the central member and removable fastenings arranged in said alining openings for the purpose set forth.

In testimony whereof I hereunto affix my signature in the presence of two witnesses.

GEORGE ANDERSON.

Witnesses:
JOHN A. ANDERSON,
M. L. DOYLE.